United States Patent [19]
Agouri et al.

[11] 3,949,018
[45] Apr. 6, 1976

[54] PREPARATION OF POLYOLEFINS WITH PEROXIDE END-GROUPS AND THEIR USE IN THE SYNTHESIS OF BLOCK COPOLYMERS

[75] Inventors: Elias Agouri; Robert Laputte; Jacques Rideau, all of Pau, France

[73] Assignee: Aquitaine Total Organico, Courvevoie, France

[22] Filed: June 12, 1972

[21] Appl. No.: 261,966

[30] Foreign Application Priority Data
June 14, 1971 France .............................. 71.21468

[52] U.S. Cl.. 260/878 B; 260/94.9 E; 260/94.9 GC; 260/880 B; 260/886
[51] Int. Cl.$^2$.. C08L 23/00; C08L 4/34; C08L 8/06; C08L 255/00
[58] Field of Search..... 260/878 B, 880 B, 94.9 GC, 260/94.9 E, 886

[56] References Cited
UNITED STATES PATENTS

| | | | |
|---|---|---|---|
| 2,971,925 | 2/1961 | Winkler et al. | 260/94.9 E |
| 3,458,598 | 7/1969 | Craven | 260/878 B |
| 3,462,403 | 8/1969 | Pendleton | 260/94.9 E |
| 3,652,724 | 3/1972 | Shimomura et al. | 260/878 B |
| 3,739,042 | 6/1973 | Chu et al. | 260/878 B |
| 3,800,007 | 3/1974 | Bafford | 260/878 B |

FOREIGN PATENTS OR APPLICATIONS
715,669    8/1965    Canada .......................... 260/94.9 E

*Primary Examiner*—Alan Holler
*Attorney, Agent, or Firm*—Norman S. Blodgett; Gerry A. Blodgett

[57] ABSTRACT

A process for the preparation of polymers containing peroxide end-groups, in which one or more monomers, particularly alpha-olefins, are polymerized by means of a co-ordination catalyst in the presence of an adjuvant with the formula M(X)p, where M is boron or a metal in column IIb of the Periodic Table of Elements, p is the valency of M, and X is at least one monovalent organic radical, a hydrogen atom or a halogen, the polymer obtained is treated with a peroxidizing agent, without being de-activated, and the resulting polymer containing peroxide groups is collected.

Polymers with peroxide end-groups obtained by this process, particularly olefins with peroxide end-groups, can be used to initiate polymerization of vinylic monomers, and are accordingly useful in the synthesis of block copolymers, in which one part is formed from the polymeric part of the macromolecular peroxide and the other part is derived from the vinylic monomer or monomers polymerized by means of this peroxide.

36 Claims, No Drawings

PREPARATION OF POLYOLEFINS WITH PEROXIDE END-GROUPS AND THEIR USE IN THE SYNTHESIS OF BLOCK COPOLYMERS

This invention concerns a process for preparing polymers, particularly polyolefins, containing peroxide end-groups. It also concerns the polymers with peroxide end-groups obtained, and their use in the synthesis of block copolymers.

Various methods exist for preparing polymers containing peroxide groups, particularly polyolefins containing such groups, in which an inert polymer, such as a polyolefin, dissolved or suspended in a liquid, is treated with a gas containing free oxygen. The peroxide groups cannot be fixed on selected sites in the polymer, such as the ends of the chains, however, so that the peroxide groups in the polymers obtained by such methods are distributed statistically along the whole polymer chain.

The applicant has found a process for preparing polymers with peroxide end-groups, applicable to any polymer or copolymer obtainable by means of co-ordination catalysis, and which is particularly useful in the synthesis of polyolefins, such as polythene and polypropylene, and olefinic copolymers containing peroxide end-groups.

The process covered by the invention consists of polymerizing one or more monomers by means of a co-ordination catalyst, in the presence of an adjuvant consisting of one or more compounds of boron or elements in column IIb of the Periodic Table of Elements, treating the polymer thus obtained with a peroxidizing agent, without de-activating it, and collecting the resulting polymer containing peroxide groups.

The principal monomers that can be used in the synthesis of the polymer to which the peroxide end-groups are to be added include monoolefins, particularly alpha-olefins with the formula $R-CH=CH_2$, where R is hydrogen or a hydrocarbon radical containing from 1 to 18 carbon atoms, such as alkyl, aryl or cyclo-alkyl, and diolefins. The commonest monomers include, without being confined to, ethylene, propylene, 1-butene, 4-methyl 1-pentene, butadiene, isoprene, styrene, methylstyrene and chlorostyrene.

The adjuvant in the presence of which co-ordination polymerization takes place has the general formula $M(X)p$, where M is boron or a metal in column IIb of the Periodic Table of Elements, p is the valency of M, and X is at least one monovalent radical, such as a hydrocarbon or alkoxy radical, or a hydrogen or halogen atom. These adjuvants include, in particular, organic compounds of boron, cadmium or zinc, in which the boron, cadmium or zinc element is linked only with hydrocarbon radicals: alkyl, aryl, aralkyl, alkaryl and cycloalkyl radicals with up to 12 carbon atoms. These compounds include, without being confined to, zinc diethyl, zinc dipropyl, zinc dibutyl, zinc diphenyl, cadmium diethyl, cadmium dibutyl. Other compounds such as zinc, cadmium or boron halides, particularly zinc dichloride, zinc ethyl chloride, or zinc, cadmium or boron alkoxides, such as $C_2H_5ZnOC_2H_5$ or $C_2H_5ZnOC_3H_7$, and organic salts such as zinc acetate, can also be used.

The co-ordination catalysts used in this process consist of organometallic compounds of metals in columns I to III of the Periodic Table of Elements, combined with compounds of one or more transition metals in columns IV to VIII of the Table. The catalyst may be deposited on or linked chemically to a carrier, which may be organic, consisting for instance of vinylic alcohol copolymers or hydroxylated polycondensates derived from formol and an amine compound, or inorganic, consisting for example of hydroxychlorides, partly hydroxylated halides, or simple or complex oxides of a bivalent metal such as magnesium, cobalt or nickel.

In one recommended embodiment, the co-ordination catalyst contains an organometallic derivative of magnesium, beryllium or aluminium, particularly a halogenated or non-halogenated organoaluminium, combined with a titanium or vanadium compound, such as a titanium halide, or vanadium halide or oxyhalide, and the adjuvant is preferably an organozinc or organocadmium such as dialkylzinc, amounting from 1 to 50 moles per atom of transition metal used.

The adjuvant may be added to the polymerization mixture at the start, but it is better to add it gradually during polymerization, thus ensuring that the concentration of adjuvant will remain roughly constant throughout co-ordination polymerization.

The amount of adjuvant used depends among other things on the rate of peroxide groups required in the final polymer. It is usually about 0.01 to 100 moles, and preferably 0.1 to 60 moles, per mole of transition metal compound.

The amounts of organometal and transition metal compound in the co-ordination catalyst are those normally used in existing methods.

Similarly, other parameters governing the co-ordination polymerization, namely the type and proportion of solvent and transfer agents, notably hydrogen, temperature and pressure, are those known in the previous art, as described for instance in Professors Ziegler's and Natta's patents or publications. In particular, co-ordination polymerization may be carried out at a temperature of between $-78°$ and $+150°C$, and preferably between $-20°$ and $+100°C$.

The peroxidizing agents used to treat the non-deactivated polymer resulting from co-ordination polymerization include, without being confined to, oxygen, air, ozone, peroxides such as benzoyl or lauroyl peroxide, hydroperoxides such as cumene or paramenthane hydroperoxide, peracids, peresters and hydrogen peroxide.

The peroxidizing agent can be added directly to the reaction mixture containing the non-deactivated co-ordination polymer, but in one recommended embodiment, the non-deactivated polymer resulting from co-ordination polymerization is separated from the medium before being placed in contact with the peroxidizing agent. This may be done by filtration or centrifugalization of the polymer suspended in the solvent, in an inert atmosphere. The remaining polymer is preferably washed with the same or another solvent, avoiding de-activation of its active sites. The non-deactivated polymer separated from the polymerization mixture may be suspended again in a fresh inert liquid, preferably an aliphatic or cycloaliphatic hydrocarbon, such as hexane, heptane or cyclohexane, or an aromatic hydrocarbon such as benzene or toluene. Other liquids which will not deactivate the active polymer or react with the metal-carbon bonds at its chain-ends may also be used, such as dioxane, tetrahydrofurane or ether.

The peroxidizing agent is then added to the resulting suspension of non-deactivated polymer.

The peroxidation temperature can vary considerably, but is usually between −80° and +100°C, and preferably between −20° and +50°C.

In one recommended embodiment of this process, the polymer with peroxide end-groups, obtained by treating the non-deactivated polymer with the peroxidizing agent, undergoes hydrolysis in a polar medium, to obtain a polymer with hydroperoxide end-groups. This may be done in a neutral or slightly acid aqueous phase, in the presence of an emulsifying agent, at a temperature of between 0° and 100°C, and preferably between 20° and 60°C.

The polymer containing peroxide or hydroperoxide groups is separated from the liquid medium in which it is dissolved or suspended by any suitable method. If peroxidation has been done in solution, the polymer can be precipitated, either by pouring this solution into an inert liquid which will not dissolve the polymer, or by evaporating the solvent by distillation. If peroxidation has been done in suspension, or hydrolysis has been performed, the polymer can be separated from the peroxidation or hydroperoxidation medium by simple filtration.

Polymers containing peroxide end-groups, as obtained by this process, can withstand temperatures which are not too high, and can easily be stored at temperatures around atmospheric temperature or below, without special precautions.

Polymers containing peroxide end-groups, as obtained by this process, can be used in various fields. In particular, polyolefins containing peroxide or hydroperoxide end-groups can be used as cross-linking agents for the corresponding polyolefins, or other polyolefins or polydiolefins.

These polymers containing peroxide end-groups also have good adhesive properties, and can be used mixed with polymers without peroxide groups, to improve their adherence on various surfaces.

One of the most useful applications of these polymers with peroxide end-groups is as radical-type initiator, for the polymerization or copolymerization of vinylic monomers, producing block copolymers in which one part is formed from the polymeric part of the macromolecular initiator, and the other is derived from the vinylic monomer or monomers to be polymerized with this radical-type macromolecular initiator.

Vinylic monomers include all monomers that can be polymerized or copolymerized by radical-type catalysis, in particular acrylic derivatives such as acrylic acid, methacrylic acid, alkyl acrylates and methacrylates, acrylonitrile, methacrylonitrile, acrylic amides; vinylic esters such as vinyl acetate; chlorovinylic derivatives such as vinyl and vinylidene chloride; styrenic derivatives such as styrene, methylstyrene and chlorostyrene; vinylic ethers and thioethers; vinylic alcohol, vinylcarbazol, vinylpyridines, vinylpyrrolidones and vinylsilanes; dienes such as butadiene and isoprene; mono-epoxidized dienes such as butadiene mono-epoxide.

In the synthesis of block copolymers, the polymer with peroxide end-groups, dissolved or suspended in an inert liquid, is placed in contact with the vinylic monomer or monomers selected to form the second sequence, at a temperature at which the macromolecular peroxide compound initiates polymerization of the monomer or monomers.

The temperature chosen for copolymerization can vary considerably, but is usually between −50° and +250°C. If it is done at below 60°C, a cocatalyst has to be added to the reaction mixture, to form a more active Redox system with the polymer containing peroxide end-groups. At between 60° and 250°C, the polymer with peroxide end-groups can initiate polymerization of the vinyl monomer or monomers itself.

The inert liquid in which the polymer with peroxide end-groups is dissolved or suspended may be a hydrocarbon such as hexane, heptane, cyclohexane, benzene or toluene, a halogenated hydrocarbon such as chlorobenzene or carbon tetrachloride, or a polar solvent such as ether or water. An aqueous phase is especially suitable when the polymer with peroxide end-groups is a hydroperoxide.

It is also possible to dissolve or suspend the polymer with peroxide end-groups directly in the liquid vinylic monomer. This allows bulk copolymerization, producing block copolymers with high vinylic monomer derivative content.

Block copolymers can also be produced by mixing the polymer with peroxide end-groups and the vinylic monomer in an extruder, which is kept at a suitable temperature.

When the block copolymers are produced in an aqueous phase, the polymer with peroxide end-groups is present in the reaction mixture in the form of a suspension. This should be stabilized by using one or more surface-active agents, which may be anionic or non-ionic, such as alkaline alkylsulphates like sodium laurylsulphate, complex polyphosphates and alkylphenoxypolyoxyethylene ethanols.

The block copolymers are separated from the reaction mixture by filtration, precipitation in a non-solvent medium, distillation of the solvent, or any other suitable method. They are then purified by extracting the homopolymers they contain, using suitable solvents.

The invention is illustrated by, without being confined to, the following examples.

EXAMPLE 1

A control series of peroxidized polythene synthesis tests was performed as follows.

Test 1 a 1 millimole of $TiCl_3$ and 2 millimoles of aluminium triethyl were added, in an inert atmosphere, to 500 ml of anhydrous heptane in a reactor, heat-regulated to 60°C. Ethylene was then injected at a pressure of 1 bar, and the reactor was kept at 60°C for 1 hour, while the contents were stirred at a speed of 500 rpm.

Excess ethylene was then eliminated by sweeping with argon, and the polymer separated from the reaction mixture by filtration, at atmospheric temperature and in a controlled atmosphere. The polymer was washed several times in anhydrous heptane, then suspended again in 500 ml of fresh heptane, placed in the reactor.

A vacuum was created in the reactor, and oxygen was injected at atmospheric temperature, until a pressure of 1 bar was obtained. The mixture was stirred for 1 hour, and then excess oxygen was eliminated by sweeping with argon.

The polymer with the peroxide groups was separated by filtration, washed in anhydrous heptane and collected in an inert atmosphere. It was then dried in a controlled vacuum, at atmospheric temperature.

Test 1 b 80 g of inert polythene, 1 millimole of TiCl₃, 2 millimoles of aluminium triethyl and 24 millimoles of zinc diethyl were added to 500 ml of anhydrous heptane in a reactor heat-regulated to 60°C. It was kept at this temperature for 1 hour, with a controlled atmosphere, and stirred at a speed of 500 rpm.

The polythene was then separated by filtration, washed in anhydrous heptane and treated with oxygen as in example 1 a.

The polythene containing peroxide groups was collected and dried as in example 1 a.

Test 1 c

The same method was adopted as in example 1 b, except that the TiCl₃ and aluminium triethyl were omitted.

Test 1 d

The same method was adopted as in example 1 b, except that half the zinc diethyl was added at the beginning, the remainder being injected continuously during the period when the polythene was in contact with the titanium and aluminium derivatives.

The results obtained in these tests are given in table 1 below.

Table 1

| Test | Zinc diethyl (m/moles) | Perox. solvent | Perox. agent | Perox temp. (°C) | Length of perox. (hrs) | Active oxygen in perox. polymer (ppm)* |
|---|---|---|---|---|---|---|
| 1.a | 0  | neptane | oxygen | 20 | 1 | 26 |
| 1.b | 24 | heptane | oxygen | 20 | 1 | 31 |
| 1.c | 24 | heptane | oxygen | 20 | 1 | 30 |
| 1.d | 24 | heptane | oxygen | 20 | 1 | 33 |

*The amount of active oxygen is found by measuring the peroxide groups, using the method involving oxidation of potassium iodide or hydriodic acid by the peroxidized polymer, and measurement of the iodine discharged, using thiosulphate.

EXAMPLE 2

A series of tests involving synthesis of polythene containing peroxide end-groups was performed, using the process defined in the invention.

Test 2 a

The same method was adopted as in example 1 a, except that 24 millimoles of zinc diethyl were also placed in the reactor, after the aluminium triethyl had been added.

Test 2 b

The same method was adopted as in example 2 a, except that only 12 millimoles of zinc diethyl were used.

Test 2 c

The same method was adopted as in example 2 a, except that half the zinc diethyl was added directly after the aluminium triethyl, the remainder being added continuously throughout the ethylene polymerization reaction.

Test 2 d

The same method was adopted as in example 2 a, except that the heptane was replaced by benzene as peroxidation solvent.

Test 2 e

The same method was adopted as in example 2 d, except that the benzene was replaced by ether.

Test 2 f

The same method was adopted as in example 2 a, except that air was used as peroxidation agent.

Test 2 g

The same method was adopted as in example 2 a, except that peroxidation was performed at a temperature of 50°C.

Test 2 h

The same method was adopted as in example 2 f, except that peroxidation was continued for 3 hours.

The variations in testing conditions, and the results obtained, are given in table 2 below.

Table 2

| Test | Zinc diethyl (m/moles) | Perox. solvent | Perox. agent | Perox. temp. (°C) | Length of perox. (hrs) | Active oxygen in perox. polymer (ppm) |
|---|---|---|---|---|---|---|
| 2.a | 24 | heptane | oxygen | 20 | 1 | 490 |
| 2.b | 12 | heptane | oxygen | 20 | 1 | 300 |
| 2.c | 24 | heptane | oxygen | 20 | 1 | 530 |
| 2.d | 24 | benzene | oxygen | 20 | 1 | 540 |
| 2.e | 24 | ether   | oxygen | 20 | 1 | 510 |
| 2.f | 24 | heptane | air    | 20 | 1 | 280 |
| 2.g | 24 | heptane | oxygen | 50 | 1 | 470 |
| 2.h | 24 | heptane | air    | 20 | 3 | 370 |

Comparison of the results for example 2 with those for example 1 (control tests) shows that the proportion of peroxide end-groups is considerably increased by the addition of zinc diethyl to the ethylene polymerization mixture, from approximately 30 ppm for the control tests to 540 ppm for example 2 d.

EXAMPLE 3

A series of tests was performed as described below, involving the preparation of polythene containing hydroperoxide end-groups.

Test 3 a

For this control test, the peroxidized polythene obtained in example 1 b underwent hydrolysis by being placed in contact with 500 ml of ion-exchanged water containing 0.2 g of lauryl sulphate, for 2 hours at 40°C, the mixture being stirred at a speed of 750 rpm.

The polythene containing hydroperoxide end-groups was then separated by filtration and collected in an argon atmosphere, and dried.

Test 3 b

The peroxidized polythene obtained in example 2 a underwent hydrolysis, by the same method as adopted in example 3 a.

Test 3 c

The peroxidized polythene obtained in example 2 b underwent hydrolysis, by the same method as adopted in example 3 b.

Test 3 d

The peroxidized polythene obtained in example 2 e underwent hydrolysis, by the same method as adopted in example 3 c.

Test 3 e

The peroxidized polythene obtained in example 2 f underwent hydrolysis, by the same method as adopted in example 3 c.

Test 3 f

Example 3 e was repeated, except that hydrolysis was continued at 50°C for 4 hours.

Variations in testing conditions, and the results obtained, are given in table 3 below.

Table 3

| Test | Origin of perox. polythene | Hydrolysis temp. (0°C) | Length of hydrolysis (hrs) | Active oxygen in hydroperoxidized polythene (ppm) |
|---|---|---|---|---|
| 3.a (control) | 1.b | 40 | 2 | 34 |
| 3.b | 2.a | 40 | 2 | 330 |
| 3.c | 2.b | 40 | 2 | 200 |
| 3.d | 2.e | 40 | 2 | 350 |
| 3.e | 2.f | 40 | 2 | 120 |
| 3.f | 2.f | 50 | 4 | 140 |

EXAMPLES 4 to 6

A series of block copolymers was prepared, using some of the peroxidized polythenes obtained in examples 1 or 2 to initiate the polymerization of vinylic monomers.

50 g of vinylic monomer were added to a suspension of 50 g of peroxidized polythene in 200 ml of deoxidized anhydrous heptane. The reaction mixture was heated to 90°C for 4 hours, while being stirred, in an inert atmosphere. The reaction mixture was then precipitated in alcohol, and the solid obtained was washed and treated while hot in a Soxhlet apparatus, using a suitable solvent of the vinylic homopolymer, until there no further loss of weight was noted. The block copolymer was then dried, and its vinylic monomer content measured by infra-red analysis.

A series of three tests was done for each example: test a, using the peroxidized polythene obtained in test 1 a; test b, using the peroxidized polythene obtained in test 1 b; and test c, using the peroxidized polythene obtained in test 2 c. Tests a and b act as controls.

The results obtained are given in table 4 below.

Table 4

| Example | 4 | | | 5 | | | 6 | | |
|---|---|---|---|---|---|---|---|---|---|
| Vinylic monomer | Styrene | | | Methyl methacrylate | | | Acrylonitrile | | |
| Test | a | b | c | a | b | c | a | b | c |
| Origin of perox. polythene | 1.a | 1.b | 2.c | 1.a | 1.b | 2.c | 1.a | 1.b | 2.c |
| % weight of vinylic monomer fixed. | 0.5 | 1 | 11 | 0.2 | 0.5 | 15 | 0.3 | 0.5 | 14 |

These results show that the vinylic monomer content of the block copolymer is considerably increased when the peroxidized polythene is prepared by the process defined in the invention.

EXAMPLE 7

3 g of peroxidized polythene, obtained in one of the tests 1 a, 1 b or 2 c, were dissolved in 100 ml of styrene purified on alumina, at a temperature of 90°C, in an inert atmosphere and while the mixture was being stirred. Stirring continued for 4 hours at this temperature. The viscous reaction mixture obtained was precipitated in alcohol, and the resulting solid was separated by filtration, washed, and treated with benzene when hot in a Soxhlet apparatus, until no further loss of weight was noted. The polythene/polystyrene block copolymer was dried in a vacuum at 40° to 50°C, then analysed by infra-red spectral analysis, to measure the amount of polystyrene fixed to the polythene.

When peroxidized polythene obtained in the control test 1 a was used, 0.5 % weight of styrene was found to be fixed to the polythene; the amount was 1 % for the polythene from test 1 b. When the peroxidized polythene had been prepared by the process defined in the invention (test 2 c), the styrene content of the polythene/polystyrene block copolymer was found to be 16 % of the total weight.

EXAMPLES 8 to 13

A series of block copolymers of ethylene and vinylic monomers was prepared, polymerization of the vinylic monomers being initiated by the polythenes with peroxide end-groups obtained as described in example 3.

50 g of hydroperoxidized polythene were dispersed in 500 ml of deoxidized distilled water containing 0.2 g of lauryl sulphate, 10.4 g of calcium chloride, 16 g of orthosodic phosphate, and 50 g of the selected vinylic monomer, in a reactor, which was then heated to the temperature chosen for the reaction, and kept there for a given length of time. The temperature and length of time depending among other things on the type of vinylic monomer used.

The resulting copolymer was separated from the reaction mixture by filtration, washed and collected in an inert atmosphere.

Two tests were done for each type of vinylic monomer: test d, using the hydroperoxidized polythene obtained in test 3 a, and test e, using the polythene from test 3 b.

Variations in testing conditions, and the results obtained, are given in table 5

Table 5

| Example | 8 | | 9 | | 10 | | 11 | | 12* | | 13* | |
|---|---|---|---|---|---|---|---|---|---|---|---|---|
| Vinylic monomer | Styrene | | Vinyl chloride | | Methyl methacrylate | | Butyl acrylate | | Vinyl acetate | | Acrylic acid | |
| Copolymerization temperature (°C) | 130 | | 120 | | 105 | | 115 | | 110 | | 110 | |
| Length of copolymerization (hrs) | 2½ | | 4 | | 4 | | 6 | | 4 | | 3 | |
| Test | d | e | d | e | d | e | d | e | d | e | d | e |
| Origin of hydroperox. polythene | 3a | 3b | 3a | 3b | 3a | 3b | 3a | 3b | 3a | 3b | 3a | 3b |
| % weight of fixed vinylic monomer | 0.8 | 20 | 0 | 16 | 1 | 30 | 1 | 7 | 0.5 | 5 | 0.1 | 5 |

*In these examples, calcium chloride and orthosodic phosphate were not used.

EXAMPLE 14

50 g of polythene containing hydroperoxide groups, obtained as described in example 3 b, were dispersed in 500 ml of deoxidized distilled water, containing 0.2 g of lauryl sulphate. 100 g of methyl methacrylate were added to this dispersion, together with enough ferrous sulphate to produce a molar ratio of hydroperoxide to ferrous sulphate of 1. The temperature of the reaction mixture was held at 20°C for 18 hours. The rate of conversion of the methyl methacrylate was found to be 70 %.

The polymerizate was separated from the reaction mixture by filtration, washed, and then treated with chloroform and acetone to extract the polymethylmethacrylate.

The resulting polythene/polymethylmethacrylate block copolymer contained 10.5 % weight of polymethylmethacrylate.

A control test was done under the same conditions, using a polythene treated as described in test 1 a. No fixation of polymethylmethacrylic blocks on the polythene occurred.

EXAMPLE 15

3 g of hydroperoxidized polythene, prepared as described in example 3, were dissolved in 100 ml of styrene, at a temperature of approximately 90°C. The reaction mixture was then heated to 120°C, and kept at this temperature for 2 hours.

The viscous reaction mixture obtained was precipitated in alcohol, and the resulting solid was separated by filtration, washed, and treated with benzene, while hot, to dissolve the polystyrene homopolymer, until no further weight loss was noted. The polythene/polystyrene block copolymer was dried in a vacuum at a temperature of approximately 40°C.

The amount of styrene fixed in the copolymer was measured by infra-red spectral analysis.

The results obtained are given in table 6 below.

Table 6

| Origin of hydroperox. polythene | Active oxygen content of hydroperox. polythene (ppm) | % weight of polystyrene in block copolymer |
|---|---|---|
| 3 a(control) | 34 | 1.3 |
| 3 b | 330 | 14 |
| 3 c | 200 | 9 |
| 3 d | 350 | 14 |
| 3 e | 120 | 7 |
| 3 f | 140 | 8 |

EXAMPLE 16

2 millimoles of TiCl$_3$, 6 millimoles of aluminium diethyl monochloride and 12 millimoles of zinc diethyl were added to 500 ml of anhydrous heptane in a reactor heat-regulated to 80°C, in a controlled atmosphere. A vacuum was created in the reactor, and propylene was injected until a pressure of 4 bars was obtained. The reactor was kept at 80°C for 1 hour, while the reaction mixture was stirred at a speed of 500 rpm.

Excess propylene was then eliminated by sweeping with argon, and the solid polymer was separated from the reaction mixture by filtration, in an argon atmosphere, washed several times in anhydrous heptane, and placed in suspension again in 500 ml of fresh anhydrous heptane.

A vacuum was created in the reactor containing the suspension of non-deactivated polypropylene, and oxygen was injected, at atmospheric temperature, until a pressure of 1 bar was obtained. Stirring continued for 1 hour, after which excess oxygen was eliminated by sweeping with argon.

The polymer with peroxide end-groups was then separated by filtration, and washed in anhydrous heptane.

The resulting solid was placed in suspension in 500 ml of ion-exchanged water containing 0.2 g of lauryl sulphate, and the suspension was kept for 2 hours at a temperature of 40°C. while being stirred at a speed of 750 rpm.

The suspension was filtered and the solid washed several times in de-ionized water, then dried in a controlled vacuum at atmospheric temperature.

The polypropylene containing hydroperoxide end-groups contained 310 ppm active oxygen.

When the same method was applied, but without using zinc diethyl during the polymerization of the propylene, the resulting product contained only 45 ppm active oxygen.

EXAMPLE 17

The polypropylene containing hydroperoxide end-groups obtained in example 16, in the presence of zinc diethyl, was placed in suspension in 250 ml of deoxidized distilled water containing 0.1 g of lauryl sulphate, 5.2 g of calcium chloride, and 8 g of orthosodic phosphate. 40 g of styrene, purified on alumina, was added to this suspension, and the mixture was raised to a temperature of 120°C, for 4 hours.

The polymer was separated from the reaction mixture, washed, dried, then treated in a Soxhlet apparatus with benzene, while hot, to extract the homopolystyrene, until no further weight loss was noted. The remaining solid residue was dried in a vacuum at 40°C.

The resulting polypropylene/polystyrene block copolymer contained 24 % weight of polystyrene, as measured by infra-red spectrographic analysis.

The test was repeated, replacing the polypropylene with hydroperoxide end-groups obtained in the presence of zinc diethyl by the product obtained without the use of zinc diethyl, and using 80 g of styrene and a suspension medium containing 500 ml of deoxidized water, 0.2 g. of lauryl sulphate, 10.4 g of calcium chloride and 16 g of orthosodic phosphate, but otherwise following the same method; the copolymer obtained after extraction of the homopolystyrene contained only 2.5 % weight of polystyrene.

EXAMPLE 18

1 millimole of $TiCl_3$, 2 millimoles of aluminium triethyl and 18 millimoles of zinc dipropyl were added to 500 ml of anhydrous heptane in a reactor heat-regulated to 60°C, in an inert atmosphere. Ethylene was then injected at a pressure of 1 bar, and the reactor was kept at 60°C for 1 hour, while the contents were stirred at a speed of 500 rpm.

Excess ethylene was eliminated by sweeping with argon, and the polymer was separated from the reaction mixture by filtration in a controlled atmosphere, at atmospheric temperature. The polymer was washed several times in anhydrous heptane, then placed in suspension again in 500 ml of fresh heptane in the reactor.

A vacuum was created in the reactor, and oxygen injected at atmospheric temperature, until a pressure of 1 bar was obtained. Stirring continued for 1 hour, after which excess oxygen was eliminated by sweeping with argon.

The polymer with peroxide groups was separated by filtration, washed in anhydrous heptane, then hydrolyzed by being placed in contact with 500 ml of ion-exchanged water containing 0.2 g of lauryl sulphate, for 2 hours at a temperature of 40°C, while being stirred at a speed of 750 rpm.

The resulting polythene with hydroperoxide end-groups was separated by filtration, collected in an inert atmosphere, and dried. Analysis showed that it contained 350 ppm active oxygen.

EXAMPLE 19

The same method was adopted as in example 18, except that the zinc dipropyl was replaced by 12 millimoles of boron triethyl.

The resulting polythene with hydroperoxide end-groups contained 230 ppm active oxygen.

EXAMPLE 20

The same method was adopted as in example 18, except that the zinc dipropyl was replaced by 24 millimoles of cadmium diethyl.

The resulting polythene with hydroperoxide end-groups contained 280 ppm active oxygen.

EXAMPLE 21

The same method was adopted as in example 16, except that the zinc diethyl was replaced by 10 millimoles of zinc di-isobutyl.

The resulting polypropylene with hydroperoxide end-groups contained 350 ppm active oxygen.

EXAMPLE 22

1 millimole of $TiCl_3$, 6 millimoles of zinc dichloride and 14 millimoles of aluminium triethyl were added to 500 ml of anhydrous heptane in a 1-liter reactor, in an inert atmosphere. The reactor was heated to 45°C, and ethylene injected at a pressure of 1 bar, over a period of 1 hour, while the reaction mixture was being stirred at a speed of 500 rpm.

Excess ethylene was eliminated by sweeping with argon, and the polythene was separated from the reaction mixture by filtration in a controlled atmosphere, at atmospheric pressure.

The polythene was then peroxidized, and the peroxidized polymer hydrolyzed as described in example 18.

The resulting polythene with hydroperoxide end-groups contained 200 ppm active oxygen.

What is claimed is:

1. A process for preparing polymers containing peroxide end-groups, in which at least one monomer is polymerized, using a co-ordination catalyst formed from an organometallic compound of a metal in columns I or III of the Periodic Table of Elements, linked with a compound of a transition metal in columns IV to VIII of this Table, in the presence of an adjuvant with the formula M(X)p, where M is one of a group consisting of boron and metals in column IIb of the Periodic Table of Elements, p is the valency of M, and X is at least one monovalent organic radical, a hydrogen atom or halogen, the resulting polymer is then treated with a peroxidation agent, without being deactivated, and the polymer with the peroxide groups that forms is collected.

2. A process as defined in claim 1, in which the adjuvant is an organic compound of one of the group consisting of boron, cadmium and zinc, the boron, cadmium or zinc element being linked only to monovalent hydrocarbon radicals containing from 1 to 12 carbon atoms, such as those in the group consisting of alkyls, aryls, cycloalkyls, aralkyls and alkaryls.

3. A process as defined in claim 1, in which the adjuvant is one of the group consisting of zinc and cadmium halides and alkoxides.

4. A process as defined in claim 1, in which the amount of adjuvant is between 0.01 and 100 moles per mole of transition metal compound.

5. A process as defined in claim 4, in which the amount of adjuvant is between 0.1 and 60 moles per mole of transition metal compound.

6. A process as defined in claim 1, in which the co-ordination catalyst contains an aluminum compound selected from aluminum alkyls and halogenated aluminum alkyls linked with one of the group consisting of titanium halides and vanadium halides and oxyhalides, and the adjuvant is a zinc dialkyl in the proportion of 1 to 50 moles per atom of titanium or vanadium.

7. A process as defined in claim 1, in which the monomers polymerized by co-ordination catalysis are chosen from the group consisting of mono-olefins, di-olefins and vinylaromatic compounds.

8. A process as defined in claim 7, in which the monomers polymerized by co-ordination catalysis are alpha-olefins with the formula R-CH=CH2, where R is one of the pair consisting of hydrogen and an alkyl radical containing from 1 to 18 carbon atoms.

9. A process as defined in claim 8, in which the alpha-olefin is at least one of the pair consisting of ethylene and propylene.

10. A process as defined in claim 1, in which peroxidation is performed in an inert liquid phase, and the peroxidation agent is selected from the group consisting of oxygen, air, ozone and peroxides.

11. A process as defined in claim 1, in which the non-deactivated polymer resulting from co-ordination polymerization is separated from its reaction mixture before undergoing peroxidation treatment.

12. A process as defined in claim 1, in which the polymer containing peroxide groups resulting from peroxidation treatment is hydrolyzed.

13. A process as defined in claim 12, in which hydrolysis is performed in a neutral or slightly acid aqueous phase, at a temperature of between 0° and 100°C.

14. A process as defined in claim 13, in which hydrolysis is performed at a temperature of between 20° and 60°C.

15. Polymers containing peroxide groups, formed from a polymeric chain derived from at least one (alpha-olefin having from 2 to 20 carbon atoms), and with a peroxide group at one of its ends, the polymeric chain being derived from one of the group consisting of mono-olefins, diolefins and vinylaromatic compounds, and in which the polymeric chain is derived from at least one alpha-olefin containing from 2 to 20 carbons at ms.

16. Polymers as defined in claim 15, in which the alpha-olefin is at least one of the pair consisting of ethylene and propylene.

17. Polymers as defined in claim 15, in which the peroxide end-group is a hydroperoxide group.

18. A process for preparing block copolymers consisting of one block derived from at least one monomer that can be polymerized by coordination catalysis and one block derived from at least one vinylic monomer that can be polymerized by radical type catalysis, comprising the steps of:

a. polymerizing at least one monomer using a coordination catalyst formed from an organometallic compound of a metal in columns I to III of the Periodic Table of Elements associated with a compound of a transition metal in columns IV to VIII of this Table, in the presence of an adjuvant with the formula $M(X)_p$, where M is one of a group consisting of boron and metals in column IIb of the Periodic Table of Elements, p is the valency of M and X is at least one member selected from a monovalent organic radical, a hydrogen atom, and a halogen atom, b. treating the resulting polymer, without deactivating it, with a peroxidation agent to form a polymer with peroxide end-groups, c. separating the polymer with peroxide end-groups from the peroxidation medium, and d. contacting in aqueous phase the separated polymer having peroxide end-groups with at least one vinylic monomer to thereby initiate the polymerization of said vinylic monomer and produce a block copolymer.

19. A process as defined in claim 18, in which the polymer containing peroxide end-groups is linked with a cocatalyst, with which it forms a Redox catalyst.

20. A process as defined in claim 19, in which the cocatalyst is ferrous sulphate.

21. A process as defined in claim 18, in which polymerization of the vinylic monomers occurs at a temperature of between −50° and +250°C.

22. A process as defined in claim 18, in which the vinylic monomers are selected from a group consisting of acrylic acid, methacrylic acid, alkyl acrylate, alkyl methacrylate, acrylonitrile, methacrylonitrile, acrylic amide, vinyl acetate, vinyl chloride, vinylidene chloride, styrene, methylstyrene, chlorostyrene, vinylic ether, vinylic thioether, vinylic alcohol, vinylcarbazol, vinylpyridine, vinylpyrrolidone, vinylsilane, butadiene, isoprene, and butadiene monoepoxide.

23. A process as defined in claim 22, in which the vinylic monomers are selected from a group consisting of styrene, vinyl acetate, vinyl chloride, acrylic and methacrylic acids, alkyl acrylates and methacrylates, acrylonitrile, and mixtures of these monomers, and the macromolecular initiator is a polythene or polypropylene containing peroxide end-groups.

24. A process as defined in claim 18, in which the adjuvant is an organic compound of one of the group consisting of boron, cadmium and zinc, the boron, cadmium or zinc element being linked only to monovalent hydrocarbon radicals containing from 1 to 12 carbon atoms, including those in the group consisting of alkyls, aryls, cycloalkyls, aralkyls and alkaryls.

25. A process as defined in claim 18, in which the adjuvant is one of the group consisting of zinc and cadmium halides and alkoxides.

26. A process as defined in claim 18, in which the amount of adjuvant is between 0.01 and 100 moles per mole of transition metal compound.

27. A process as defined in claim 26, in which the amount of adjuvant is between 0.1 and 60 moles per mole of transition metal compound.

28. A process as defined in claim 18, in which the coordination catalyst contains an aluminum alkyl linked with one of the group consisting of titanium halides and vanadium halides and oxyhalides, and the adjuvant is a zinc dialkyl in the proportion of 1 to 50 moles per atom of titanium or vanadium.

29. A process as defined in claim 18, in which the monomers polymerized by coordination catalysis are chosen from the group consisting of mono-olefins, di-olefins and vinylaromatic compounds.

30. A process as defined in claim 29, in which the monomers polymerized by coordination catalysis are alpha-olefins with the formula R-CH=CH2, where R is one of the pair consisting of hydrogen and an alkyl radical container from 1 to 18 carbon atoms.

31. A process as defined in claim 30, in which the alkyl radical is at least one of the pair consisting of ethyl and propyl.

32. A process as defined in claim 18, in which peroxidation is performed in an inert liquid phase, and the peroxidation agent is selected from the group consisting of oxygen, air, ozone and peroxides.

33. A process as defined in claim 18, in which the non-deactivated polymer resulting from coordination polymerization is separated from its reaction mixture before undergoing peroxidation treatment.

34. A process as defined in claim 18, in which the polymer containing peroxide groups resulting from peroxidation treatment is hydrolyzed.

35. A process as defined in claim 34, in which hydrolysis is performed in a neutral or slightly acid aqueous phase, at a temperature of between 0° and 100°C.

36. A process as defined in claim 35, in which hydrolysis is performed at a temperature of between 20° and 60°C.

* * * * *